United States Patent [19]
Takada et al.

[11] Patent Number: 5,883,732
[45] Date of Patent: Mar. 16, 1999

[54] OPTICAL SCANNER

[75] Inventors: Kyu Takada; Nozomu Inoue; Takashi Hama; Yujiro Nomura, all of Nagano, Japan

[73] Assignee: Seiko Epson Corporation, Tokyo, Japan

[21] Appl. No.: 644,493

[22] Filed: May 10, 1996

[30] Foreign Application Priority Data

| May 12, 1995 | [JP] | Japan | 7-114971 |
| Feb. 9, 1996 | [JP] | Japan | 8-024525 |

[51] Int. Cl.$^6$ .................................................. G02B 26/08
[52] U.S. Cl. .......................... 359/207; 359/204; 359/206; 359/662; 347/244; 347/259
[58] Field of Search ..................... 359/204, 205, 359/206, 207, 215, 662; 347/244, 258, 259

[56] References Cited

U.S. PATENT DOCUMENTS

| 4,253,102 | 2/1981 | Kataoka et al. | 347/234 |
| 4,352,541 | 10/1982 | Minoura et al. | |
| 4,561,717 | 12/1985 | Kataoka et al. | |
| 4,585,296 | 4/1986 | Minoura et al. | |
| 4,731,623 | 3/1988 | Oda et al. | 347/137 |
| 4,847,644 | 7/1989 | Oda et al. | 346/160 |
| 4,866,459 | 9/1989 | Tokita et al. | 346/108 |
| 4,934,772 | 6/1990 | Sakuma et al. | |
| 4,955,682 | 9/1990 | Yamaguchi et al. | |
| 4,971,411 | 11/1990 | Takanashi | 359/206 |
| 5,005,928 | 4/1991 | Suzuki et al. | 359/206 |
| 5,008,686 | 4/1991 | Saito | 346/108 |
| 5,111,219 | 5/1992 | Makino | 346/108 |
| 5,329,399 | 7/1994 | Ho | 359/662 |
| 5,343,325 | 8/1994 | Yamakawa | 359/205 |
| 5,453,870 | 9/1995 | Iima | 359/662 |

FOREIGN PATENT DOCUMENTS

| 0 291 313 | 11/1988 | European Pat. Off. |
| 0 328 915 | 8/1989 | European Pat. Off. |
| 0328915 | 8/1989 | European Pat. Off. |
| 0461660 | 12/1991 | European Pat. Off. |
| 0507344 | 10/1992 | European Pat. Off. |
| 0559423 | 9/1993 | European Pat. Off. |
| 51-100742 | 9/1976 | Japan |
| 60-33019 | 7/1985 | Japan |
| 254211 | 2/1990 | Japan |
| 220986 | 5/1990 | Japan |
| 450908 | 2/1992 | Japan |
| 441807 | 7/1992 | Japan |
| 8-297256 | 11/1996 | Japan |

Primary Examiner—Cassandra Spyrou
Assistant Examiner—Darren E. Schuberg
Attorney, Agent, or Firm—Sughrue, Mion, Zinn, Macpeak & Seas, PLLC

[57] ABSTRACT

To provide an optical scanner for typical use with laser beam printers that is capable of effective correction of aberrational characteristics and which also produces a constant beam spot size, a semiconductor laser array 1 having a plurality of light-emitting portions issues a plurality of beams, which are reflected and deflected by reflecting surfaces of rotating polygonal mirror 5 and pass through imaging lens 6 to form a plurality of beam spots on the surface to be scanned 7. Both the entrance and exit surfaces of imaging lens 6 are such that the curvatures in the sub- and main scanning directions are independent of each other, with the curvature in the sub-scanning direction varying continuously in the main scanning direction over the effective area of imaging lens 6.

13 Claims, 14 Drawing Sheets

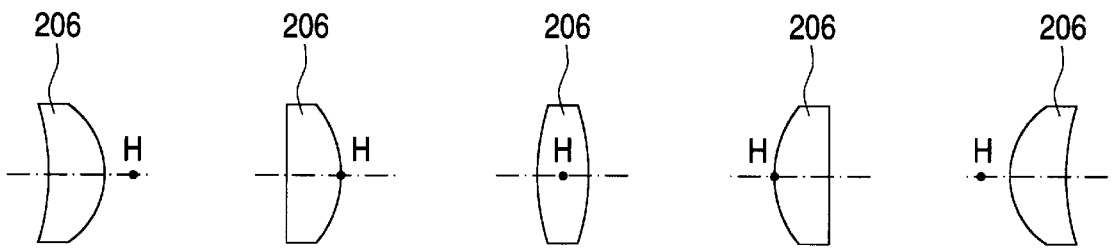
FIG. 3A     FIG. 3B     FIG. 3C     FIG. 3D     FIG. 3E
FIG. 4
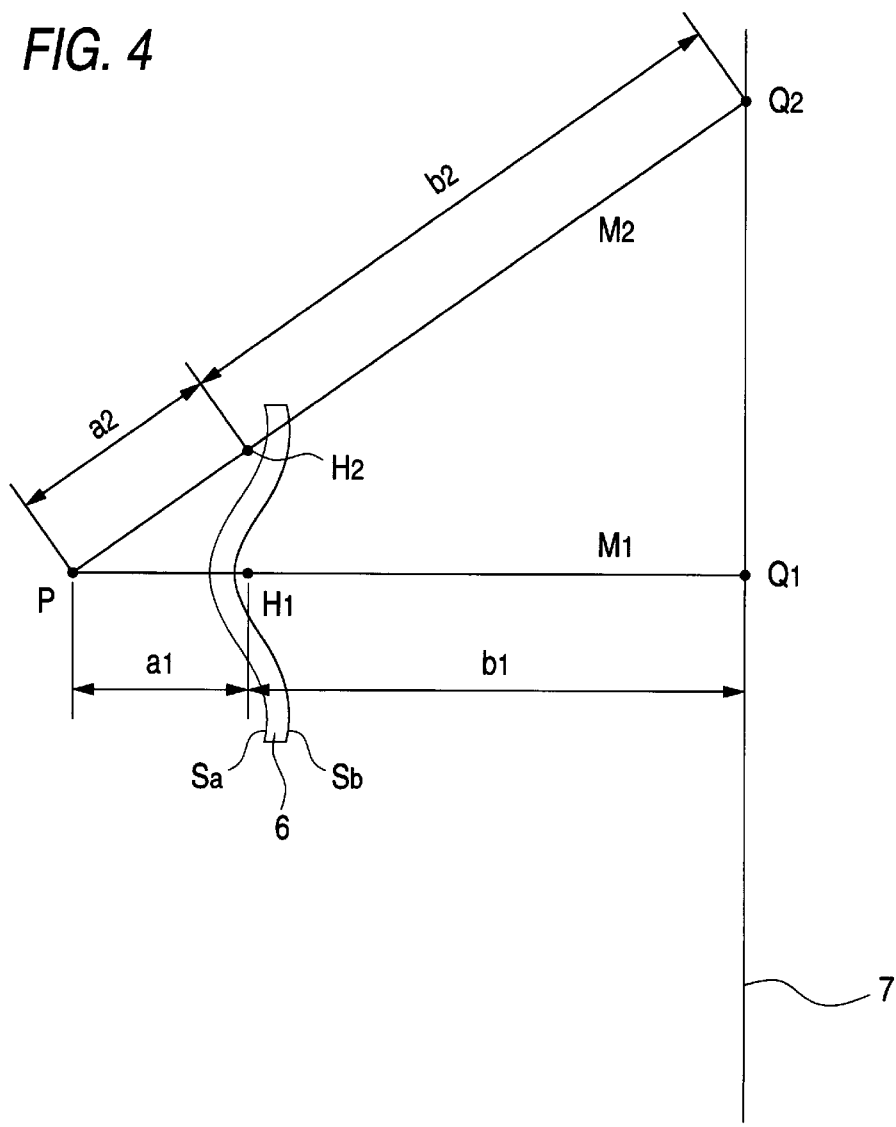

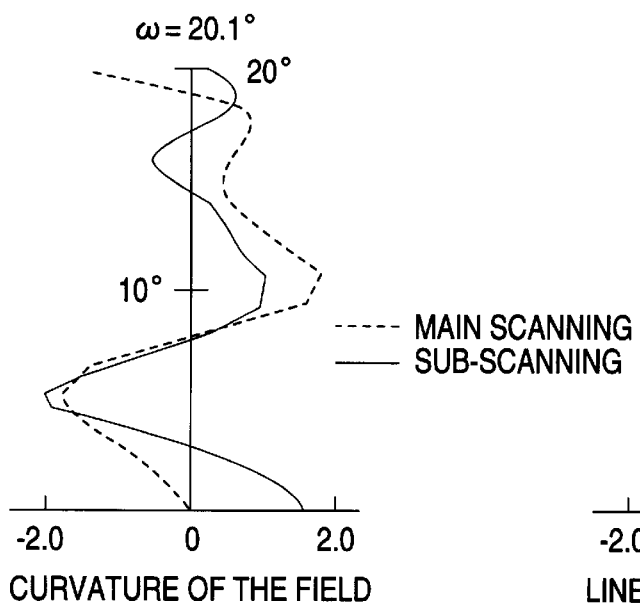
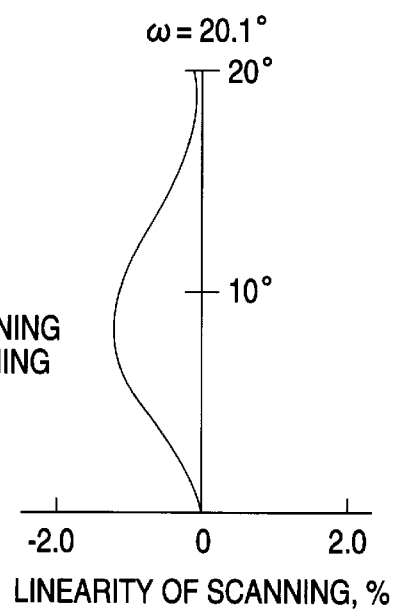
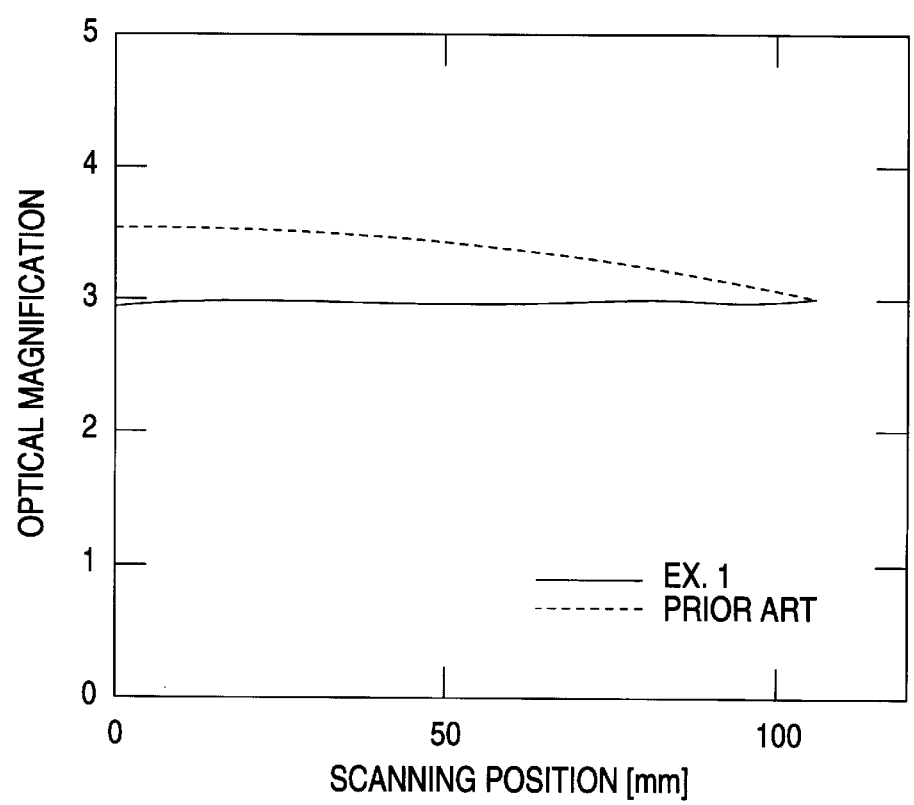

OPTICAL SCANNER

BACKGROUND OF THE INVENTION

The present invention relates to an optical scanner for use with laser beam printers and the like.

Imaging lenses for use with optical scanners are required to have two aberrational characteristics. First, they should have a specified negative distortion to achieve scanning at uniform speed; second, they should have a small enough curvature of the field to provide a flat image plane such that the beam spot size is close to a diffraction limited value.

The imaging lens used with conventional optical scanners is composed of one or more elements. If the aberrational characteristics are paramount, an increased number of lens elements are used and a single lens is used if the cost is important. To provide further improved aberrational characteristics, the use of aspheric surfaces on the imaging lens is a recent approach as typically shown in Unexamined Published Japanese Patent Application No. 50908/1992. The imaging lens taught in this reference is characterized in that both the entrance and exit faces have their curvatures in a sub-scanning direction varied continuously over the effective lens area along a main scanning direction. In regard of the entrance face which is symmetric with respect to the optical axis, the curvatures in the main and sub-scanning directions are dependent on each other.

To achieve high-speed scanning, Unexamined Published Japanese Patent Application No. 100742/1976 proposed that a semiconductor laser array having a plurality of independently modulative light-emitting portions be used as a light source so that more than one scanning line could be produced simultaneously by one scanning cycle.

However, an optical scanner using such a semiconductor laser array had the problem that the beams applied formed unevenly spaced scanning lines.

With a view to solving this problem, Unexamined Published Japanese Patent Application No. 158251/1979 proposed that the plurality of light-emitting portions in the semiconductor laser array be arranged at an angle with the main scanning direction such that the variation in the spacing between scanning lines could be reduced.

Another approach was proposed by Unexamined Published Japanese Patent Application No. 161566/1981, which ensured a constant spacing between scanning lines by locating a cylindrical lens away from the surface to be scanned by a distance substantially equal to the focal length of the lens.

The spacing between scanning lines can also be made constant by providing an ultrasonic optical deflector between a light source and a rotating polygonal mirror as taught in Unexamined Published Japanese Patent Application No. 21031/1985; this approach is based on the correction of the curvature of scanning lines by adjusting the Bragg diffraction angle.

According to yet another proposal made by Unexamined Published Japanese Patent Application No. 54211/1990, the lateral magnification of optics ranging from the light-emitting portions to the surface to be scanned is adjusted to be no more than 2 in absolute value such that the spacing between scanning lines that are produced simultaneously is sufficiently reduced to minimize the variation in that spacing.

These proposals, however, have had their own problems. Speaking of the imaging leans taught in Unexamined Published Japanese Patent Application No. 50908/1992, the optical magnification in the sub-scanning direction varies within the effective scanning region, so the diameter in the sub-scanning direction of a beam spot that is formed on the surface to be scanned becomes uneven within the effective scanning region. If an optical scanner incorporating such an imaging lens is used with a laser beam printer, the print density obtained is so uneven that one cannot produce satisfactory print quality.

Referring to the optical scanner that employs a semiconductor laser array as a light source to achieve simultaneous production of more than one scanning line by a single scanning cycle, the approach taught in Unexamined Published Japanese Patent Application No. 158251/1979 has the disadvantage that the variations in the spacing between scanning lines cannot be completely corrected. In addition, if the number of beams is increased, there occurs a corresponding increase in the amount of variation in the spacing between scanning lines. Therefore, the number of beams cannot be increased to such a value that the advantage of performing high-speed scanning with a plurality of beams is exhibited to the fullest extent.

The approach proposed in Unexamined Published Japanese Patent Application No. 161566/1981 requires not only a plurality of semi-conductor lasers but also as many mirrors and cylindrical lenses as the beams to be produced. This adds greatly to the cost of the overall system and increases the complexity and size of the optics, thereby making the system far from being practically feasible.

The ultrasonic optical deflector taught in Unexamined Published Japanese Patent Application No. 21031/1985 is not only expensive, complicated and bulky but also requires a complicated drive circuit.

In the proposal made by Unexamined Published Japanese Patent Application No. 54211/1990, the lateral magnification is as low as 2 or less, so most of the optical output of the semiconductor laser is lost by "vignetting" and only a small part of the output reaches the surface to be scanned, with the result that the optics can achieve a very low efficiency in optical output. Hence, the optical output of the semi-conductor laser is insufficient for practical purposes. What is more, the variation in the spacing between scanning lines is not completely corrected but merely reduced in proportion to the decrease in the lateral magnification and the problem at issue cannot be completely solved.

SUMMARY OF THE INVENTION

The present invention has been accomplished under these circumstances and has as an object providing an optical scanner that is effectively compensated for the aberrational characteristics related to curvature of the field and scanning at uniform speed, that assures a constant magnification in the sub-scanning direction for the imaging lens within the effective scanning region and that produces a constant beam spot size.

Another object of the invention is to provide a practical optical scanner for use with a light source having a plurality of light-emitting portions that assures a constant spacing between scanning lines and efficient utilization of the optical output.

These objects of the invention can be attained by an optical scanner having a source of a light beam, a deflector for deflecting said light beam and an imaging lens that focus the deflected light beam to form a beam spot on a surface to be scanned, the improvement wherein the curvatures in a sub-scanning direction of at least two of the surfaces of said imaging lens vary continuously along a main scanning direction over the effective area of said imaging lens and independently of the curvatures in the main scanning direction.

In preferred embodiments, the optical scanner of the invention adopts either one of the following features:
1) the optical magnification of the imaging lens in the sub-scanning direction is constant over the effective scanning region;
2) the imaging lens is a single lens;
3) the imaging satisfies either one of the following requirements:
   a) the entrance face of the imaging lens have a cross section taken in the sub-scanning direction which is concave at the center of scanning and convex at either end of scanning;
   b) the exit face of the imaging lens have a cross section taken in the sub-scanning direction which is convex at the center of scanning and concave at either end of scanning;
4) the imaging lens satisfies both requirements a) and b);
5) the imaging lens has a surface that is aspheric in the main scanning direction or a surface having a point of inflection in the main scanning direction;
6) the light source has a plurality of light-emitting portions; and
7) that element of the imaging lens which has such a surface that the curvature in the sub-scanning direction varies continuously along the main scanning direction over the effective area of the imaging lens is made of resin.

BRIEF DESCRIPTION OF THE DRAWINGS

FIGS. 3A to 3E show various shapes of a common imaging lens as obtained by "bending";

FIG. 4 shows a larged cross section of the imaging lens taken in the main scanning direction and principal point in sub-scanning direction as it is used in the optical scanner of the invention;

FIGS. 7A and 7B plot aberration curves that occur in the optics shown in FIG. 6;

FIG. 8 plots the optical magnification in the sub-scanning direction of the system of Example 1;

DESCRIPTION OF THE PREFERRED EMBODIMENTS

The invention will now be described in detail with reference to the accompanying drawings.

Figure 1:
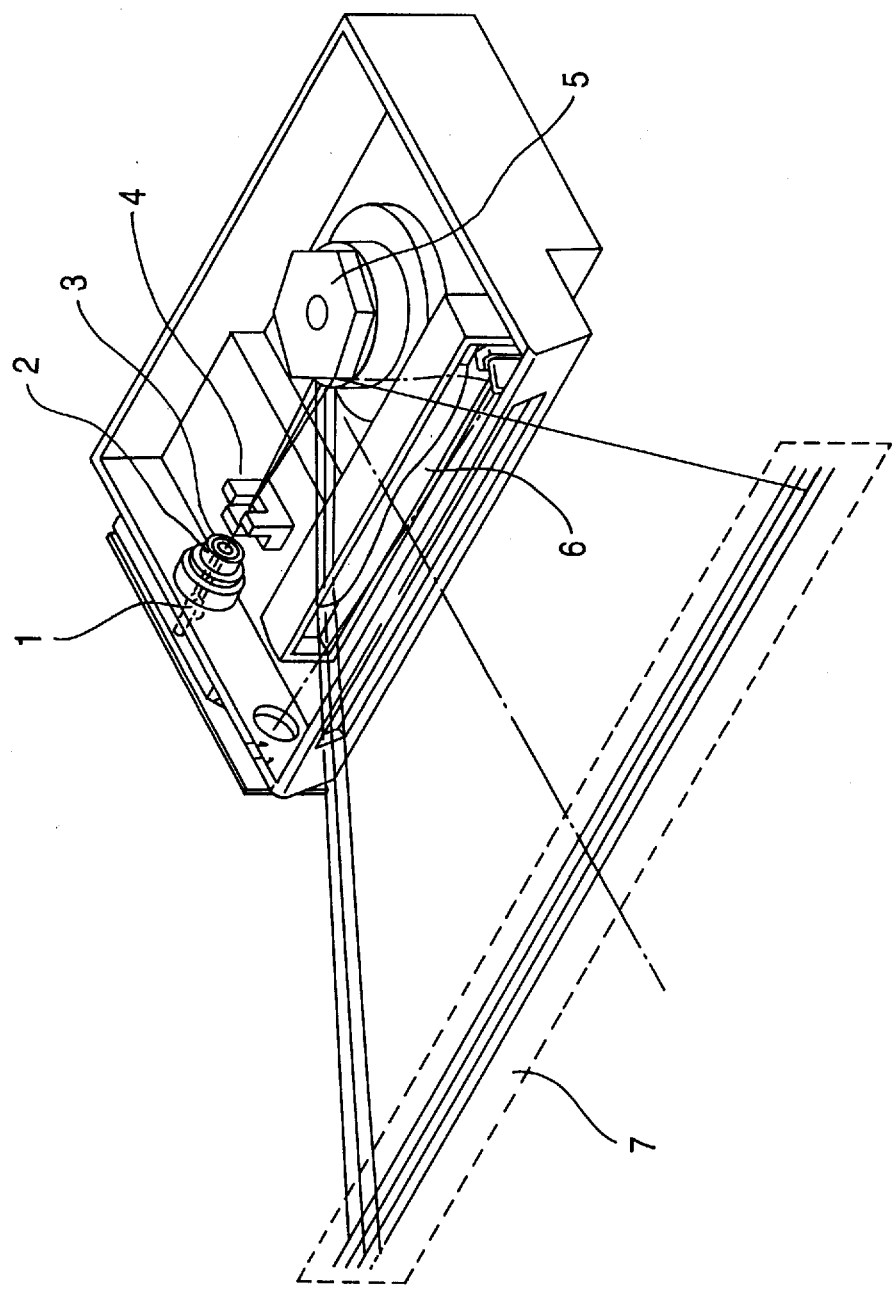
FIG. 1 is a perspective view of the optical scanner of the present invention.

FIG. 1 shows an optical scanner as an embodiment of the present invention. In the following description, the direction which is parallel to the rotating axis of a deflector is defined as a "sub-scanning direction" and the direction which is perpendicular to both the sub-scanning direction and the optical axis is defined as a "main scanning direction".

A semiconductor array 1 which is a light source having a plurality of light-emitting portions issues a plurality of beams, which are transformed to a slightly convergent beam by a collimator lens 2, further reduced in diameter by passage through an aperture 3 and subjected to the converging action of a cylindrical lens 4 in only the sub-scanning direction. The beam is then adjusted in the sub-scanning direction, focused at a point near a reflecting face of a rotating polygonal mirror 5 serving as a deflector and reflected by that reflecting face. Thus, the beam is deflected as the polygonal mirror 5 rotates. The deflected beam is subjected to the converging action of an imaging lens 6, thereby forming a plurality of beam spots on a surface 7 to be scanned.

Figure 2:
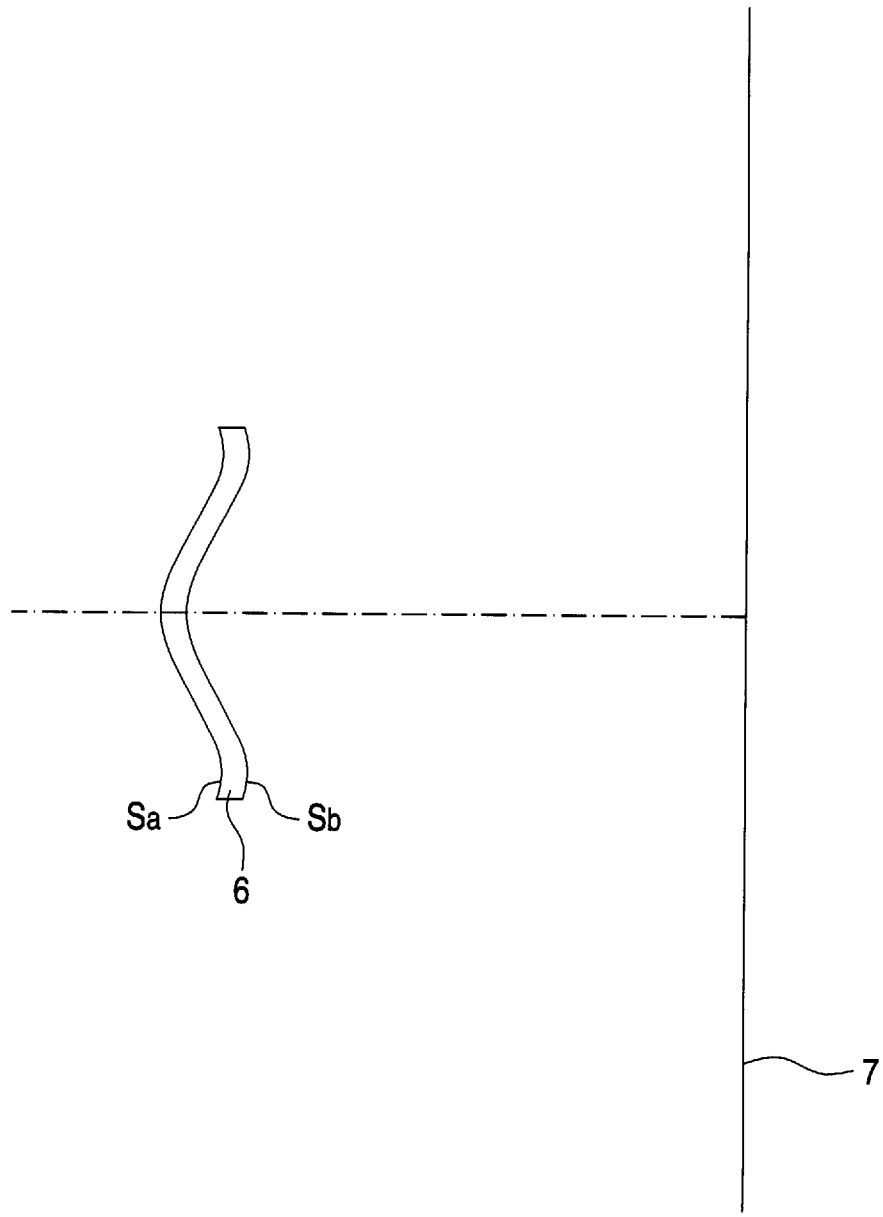
FIG. 2 shows a cross section of the imaging lens taken in the main scanning direction as it is used in the optical scanner of the invention.

FIG. 2 shows a cross section of the imaging lens 6 taken in the main scanning direction. As shown, the cross section of the imaging lens 6 taken in the main scanning direction is aspheric at both the entrance surface Sa and the exit surface Sb and achieves better aberrational correction than spherical lenses. Although the imaging lens 6 is composed of a single element, it effectively corrects aberrational characteristics in terms of both curvature of the field and scanning linearity. It should be particularly noted that both the entrance surface Sa and the exit surface Sb have a point of inflection in their cross section taken in the main scanning direction such that the entrance surface Sa is convex toward the polygonal mirror 5 at the center of scanning and concave at either end of scanning whereas the exit surface Sb is concave away from the surface to be scanned 7 at the center of scanning and convex at either end of scanning. This lens geometry is very effective for the purpose of correcting aberrations in the main scanning direction.

To correct the curvature of the field in the sub-scanning direction, either one of the entrance and exit surfaces of the imaging lens need have a refractive power in the sub-scanning direction, namely, a cross section of the imaging lens taken in the sub-scanning direction need be planoconvex. The curvature of the field in the sub-scanning direction can be completely corrected if the curvature in the sub-scanning direction of a lens surface having a refractive power in the sub-scanning direction is varied continuously along the main scanning direction over the effective area of the imaging lens such that the imaging point in the sub-scanning direction will always be located on the surface to be scanned by scanning at any point in the effective scanning region. In practice, however, the correction of aberrations in the sub-scanning direction has only one degree of freedom and the optical magnification of the imaging lens in the sub-scanning direction cannot be held constant over the effective scanning region.

To deal with this problem, both the entrance and exit surfaces of the imaging lens used in the embodiment under discussion are so adapted that the curvature in the sub-scanning varies continuously along the main scanning direction over the effective area of the imaging lens and independently of the curvature in the main scanning direction. This adds one degree of freedom in the correction of aberrations in the sub-scanning direction and hence is effective in assuring that the optical magnification in the sub-scanning direction is held constant.

This point will now be described with particular reference to FIGS. 3A to 3E. If the curvatures of both surfaces of a common imaging lens 206 can be set at desired values in the sub-scanning direction without affecting their refractive power, the principal point H can also be set at desired positions by "bending" as shown in FIGS. 3A to 3E. This means one need set the curvatures of both lens surfaces in the sub-scanning direction such that the optical magnification in the sub-scanning direction will be constant over the effective scanning region. In the embodiment under discussion, the cross section of the imaging lens taken in the sub-scanning direction is such that at the center of scanning, the entrance surface is concave and the exit surface is convex so that the principal point $H_1$ in the sub-scanning direction is located at the side of the surface to be scanned 7 of the imaging lens 6 as shown in FIG. 4. On the other hand, the entrance and exit surfaces are respectively convex and concave at either end of scanning, so that the principal point, $H_2$ is located at the side the rotating polygonal mirror of the imaging lens. As a result, $b_1/a_1$ which is the optical magnification at the center of scanning in the sub-scanning direction is equal to $b_2/a_2$ which is the optical magnification at either end of scanning in the sub-scanning direction. This is the principle on which the curvatures of the imaging lens are derived such that the optical magnification is held constant in the sub-scanning direction throughout the effective scanning region including the center as well as both ends of scanning.

It should also be noted that even with lens surfaces that vary continuously in the curvature in the sub-scanning direction, the curvatures in the main and sub-scanning directions will depend on each other if the surfaces are aspheric and symmetric with respect to the optical axis and, therefore, one cannot hold the optical magnification in the sub-scanning direction constant without a sufficient number of the degrees of freedom to achieve simultaneous correction of aberrations in both the main and sub-scanning directions. Hence, in order to assure a constant optical magnification in the sub-scanning direction, the imaging lens must be such that the curvature in the sub-scanning direction varies continuously along the main-scanning direction over the effective area of the imaging lens and independently of the curvature in the main-scanning direction. It should be noted here that on the optical axis the curvature in the main scanning direction may be the same as the curvature in the sub-scanning direction.

In the optical scanner according to the embodiment described above, the optical magnification of the imaging lens in the sub-scanning direction is constant throughout the effective scanning region and, hence, the beam spot formed on the surface being scanned has a uniform size in the sub-scanning direction, is free from unevenness in resolution and suitable for assuring high resolution and satisfactory optical characteristics. In the embodiment under consideration, the light source is a semiconductor laser array having a plurality of light-emitting portions but a semiconductor laser having a single light-emitting portion may also be used as a light source to ensure the advantage of providing a uniform beam spot size in the sub-scanning direction.

The constant optical magnification in the sub-scanning direction offers the added advantage of ensuring a constant spacing between adjacent scanning lines. This contributes to the fabrication of an optical scanner having satisfactory optical characteristics such that by means of scanning with a plurality of beams, scanning can be accomplished at higher speed and resolution with the spacing between scanning lines held constant.

In the embodiment under discussion, the imaging lens is a single lens. However, this is not the sole case of the invention and its concept equally applies to the case where the imaging lens is composed of more than one element. In other words, the optical magnification of the imaging lens in the sub-scanning direction can be held constant by assuring that the curvatures in the sub-scanning direction of at least two surfaces of the imaging lens are varied continuously along the main scanning direction over the effective area of the imaging lens.

The imaging lens 6 in the embodiment under discussion is thin in the axial direction and its thickness will not vary greatly at off-axis points. Such a thin lens has the advantage that not only can it be formed of a smaller quantity of constituent materials but in can also be manufactured by molding within sufficiently shorter molding cycles to eliminate the internal strain. The lens having small variations in thickness has the added advantage that it can be manufactured by injection molding with the molding material flowing sufficiently uniformly to eliminate the internal strain.

Thus, the imaging lens 6 is thin and produces only a small converging action in the main scanning direction, so in order to ensure that a focused beam spot will form on the surface to be scanned 7, a beam that is convergent in the main scanning direction is launched into the imaging lens 6.

Explanation will be made as to an optical magnification in the sub-scanning direction in the case where the curvature in the sub-scanning direction is changed independently of the curvature of the main scanning direction in the relatively thin imaging lens 6 having such a cross section in the main scanning direction that the correction of the curvative of field in the main scanning direction and the linearity of scanning are compatible. In this case, also, the cross section in the sub-scanning direction meets the requirement that the curvature of field be well corrected.

Figure 5:
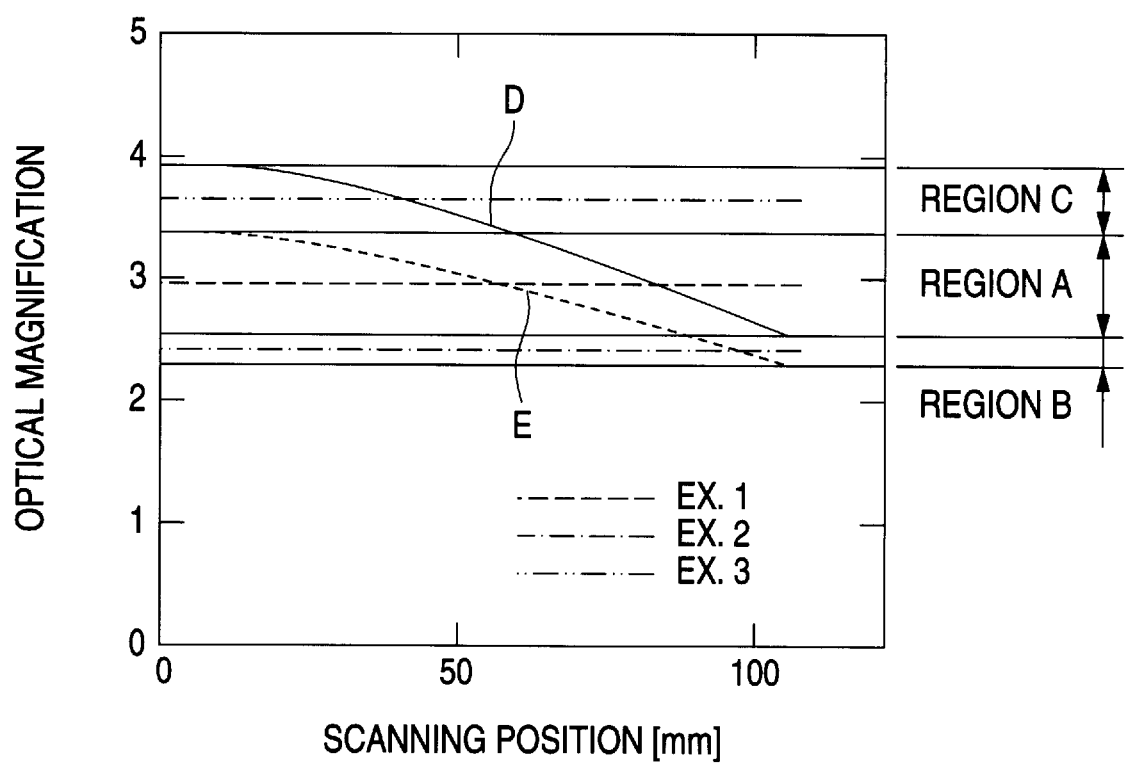
FIG. 5 is a graph showing the relationship between the surface geometry of the cross section of the imaging lens taken in the sub-scanning direction and its optical magnification in the sub-scanning direction.

The horizontal axis of the graph shown in FIG. 5 plots the scanning position in the surface to be scanned 7 and the vertical axis plots the optical magnification of the imaging lens 6 in the sub-scanning direction for various scanning positions. The curve D indicated by the solid line and the curve E indicated by the dotted line show the points where the convex/concave shape is changed in cross section in the sub-scanning direction. In the region above the curve D, the cross section of the imaging lens in the sub-scanning direction has a meniscus shape having a concave shape on the incident side and a convex shape on the emergent side. On the curve D, the cross section has a planoconvex shape having a linear on the incident side and a convex shape on the emergent side. In the region between the curve D and the curve E, the cross section has a biconvex shape having convex shapes on both incident and emergent sides in the sub-scanning direction. On the curve E, the cross section in the sub-scanning direction has a planoconvex shape having a convex shape on the inciden Bide and a linear shape on the emergent side. In the region of the imaging lens 6 below the curve E, the cross section in the sub-scanning direction has a meniscus shape having a convex shape on the incident side and a concave shape on the emergent side.

In contrast, the lens having the constant optical magnification is represented in a horizontal line in FIG. 5. Accordingly, in the case where the horizontal line intersects with the curves D and E, at the positions in the main scanning direction, the curvature is reversed in the sub-scanning direction. Accordingly, the following explanation will be given as to the change of the surface in the sub-scanning direction by the definition that the region of the optical magnification where the horizontal line intersects only with the curve D is represented by C; the region of the optical magnification where the horizontal line intersects with both the curves D and B is represented by A; and the region of the optical magnification where the horizontal line intersects only with the curve E.

Region A noted in FIG. 5 is that of the imaging lens 6 where the shape of the cross section taken in the sub-scanning direction changes from being concave to convex at the entrance face but changes from being convex to concave at the exit face over the range from the center of scanning to either end of scanning; region B is that of the imaging lens where the shape of the cross section taken in the sub-scanning direction changes from being concave to convex at the entrance face over the range from the center of scanning to either end of scanning but is always convex throughout the exit face; region C is that of the imaging lens where the shape of the cross section taken in the sub-scanning direction is always convex throughout the entrance face but changes from being convex to concave at the exit face over the range form the center of scanning to either end of scanning. These regions A, B and C are respectively embodied in Examples 1, 2 and 3 to be described later in this specification.

Further referring to FIG. 5, the curvature of the exit face at the center of scanning increases in the sub-scanning direction within the area below region B, thus creating an increased spherical aberration, whereas the curvature of the entrance face at either end of scanning increases in the sub-scanning direction within the area above region C, also creating an increased spherical aberration. Therefore, the surface geometry of imaging lens 6 desirably belongs to either one of the regions A, B and C to ensure the fabrication of an optical scanner having satisfactory optical characteristics that develops a small spherical aberration, that is completely corrected in the curvature of the field in the sub-scanning direction and that provides a constant optical magnification in the sub-scanning direction. The fact that the surface geometry of the imaging lens belongs to either one of the regions A, B and C means that either one of the following requirements is satisfied:

a) the entrance face of the imaging lens have a cross section taken in the sub-scanning direction which is concave at the center of scanning and convex at either end of scanning;

b) the exit face of the imaging lens have a cross section taken in the sub-scanning direction which is convex at the center of scanning and concave at either end of scanning.

It should particularly be mentioned that if the surface geometry of the imaging lens belongs to region A, the curvature in the sub-scanning direction can be reduced to a comparatively small value for both the entrance and exit faces and a beam spot of a very satisfactory shape can be produced in the substantial absence of spherical aberration. The fact that the surface geometry of the imaging lens belongs to region A means that it satisfies both requirements a) and b) set forth above.

In the embodiment under discussion, the imaging lens is formed of a resin. Manufacturing aspheric lenses from glass is costly and hence impractical. On the other hand, aspheric lenses can easily be manufactured in large quantities and at low cost if they are molded of resins.

The foregoing description is directed to the case where a rotating polygonal mirror is used as the deflector but this is not the sole case of the invention and an equally effective deflector can easily be realized in the form of a rotating single mirror, a rotating double mirror of a galvano-mirror which oscillates sinusoidally about a rotating shaft.

In the embodiment described above, a slightly convergent beam is issued from the collimator lens but this is not the sloe case of the invention and a constant optical magnification can be assured in the sub-scanning direction by means of a parallel beam or a slightly divergent beam to provide the intended advantages of the invention.

As will be apparent from the foregoing description, the invention is particularly effective if it is applied to a laser beam printer but it is also applicable to image forming apparatus such as a digital copier, facsimile equipment and a laser scanning display, image inputting apparatus such as a image scanner, as well as an optical mark reading laser scanner and a surface inspecting laser scanner.

EXAMPLE 1

The optical specifications of a typical example of the embodiment described above are set forth in Table 1. The angle through which the rotating polygonal mirror rotates to complete one scanning cycle is designated by $2\omega$. The point of light emission from the semiconductor laser array is designated by $S_1$; the entrance and exit surfaces of the collimator lens are designated by $S_2$ and $S_3$, respectively; the entrance and exit surfaces of the cylindrical lens are designated by $S_4$ and $S_5$, respectively; a reflecting surface of the rotating polygonal mirror is designated by $S_6$; and the entrance and exit surfaces of the imaging lens are designated by $S_7$ and $S_8$, respectively. As for the symbols of the optical parameters involved, the radius of curvature of an ith surface $S_i$ is designated by $r_1$, the on-axis distance form the ith surface to the adjacent surface is designated by $d_i$, and the refractive indices of the collimator lens, cylindrical lens and the imaging lens are designated by $n_2$, $n_4$ and $n_7$, respectively. With an anamorphic lens surface, the radii of curvature in the sub- and main scanning directions are designated by $r_{ix}$ and $r_{iy}$, respectively, and the radius of curvature of an aspheric surface is represented by a paraxial value. The exception is the designation for the imaging lens in the sub-scanning direction and the radius of curvature is replaced by curvature $u_i$.

TABLE 1

2ω = 40.0°

| Surface $S_i$ | Radius of curvature $r_i$ | | Distance between surfaces $d_i$ | Refractive index $n_i$ |
|---|---|---|---|---|
| $S_1$ | | | 15.264 | |
| $S_2$ | ∞ | | 2.800 | 1.67500 |
| $S_3$ | −10.800 | | 8.000 | |
| $S_4$ | $r_{4x}$ | 25.223 | 3.000 | 1.51118 |
| | $r_{4y}$ | ∞ | | |
| $S_5$ | ∞ | | 40.000 | |
| $S_6$ | ∞ | | 30.000 | |
| $S_7$ | $u_{7x}$ | 0.070777 | 6.000 | 1.57800 |
| | $r_{7y}$ | 18.167 | | |
| $S_8$ | $u_{8x}$ | −0.11513 | 114.000 | |
| | $r_{8y}$ | 17.139 | | |

The imaging lens has aspheric surfaces in a cross section taken in the main scanning direction and they are expressed by:

$$z_i = \frac{y^2/r_{iy}}{1 + \sqrt{1 - (K_i + 1)(y/r_{iy})^2}} + A_i y^4 + B_i y^6 + C_i y^8 + D_i y^{10}$$

The coordinate system for this equation is such that the origin is at the point of intersection between a lens surface and the optical axis, with the z axis being parallel to the optical axis and the y axis being perpendicular to the optical axis and parallel to the main scanning direction; $K_i$, $A_i$, $B_i$, $C_i$ and $D_i$ are aspheric coefficients. The curvature of the imaging lens in the sub-scanning direction varies continuously along the main scanning direction over the effective area of the imaging lens and the curvature $U_i$ is expressed by $$U_i = U_{ix} + A_{ix} y^2 + B_{ix} y^4 + C_{ix} y^6 + D_{ix} y^8 + E_{ix} y^{10}$$

where $u_{ix}$ is the curvature on the optical axis and $A_{ix}$, $B_{ix}$, $C_{ix}$, $D_{ix}$ and $E_{ix}$ are coefficients. The values of these coefficients are shown in Table 2.

TABLE 2

| $r7_y$ | 18.167 | $r_{8y}$ | 17.139 |
|---|---|---|---|
| $K_7$ | −5.1910 | $K_8$ | −5.5897 |
| $A_7$ | −2.4074E-6 | $A_8$ | −2.9273E-6 |
| $B_7$ | −3.2387E-10 | $B_8$ | 9.1596E-11 |
| $C_7$ | 9.2043E-14 | $C_8$ | 6.0670E-15 |
| $D_7$ | −2.2206E-17 | $D_8$ | −4.2985E-17 |
| $u_{7x}$ | −0.070777 | $u_{8x}$ | −0.11513 |
| $A_{7x}$ | 6.1697E-4 | $A_{8x}$ | 4.8210E-4 |
| $B_{7x}$ | −1.6903E-6 | $B_{8x}$ | −1.0916E-6 |
| $C_{7x}$ | 2.9372E-9 | $C_{8x}$ | 1.7455E-9 |
| $D_{7x}$ | −2.5833E-12 | $D_{8x}$ | −1.4006E-12 |
| $E_{7x}$ | 8.7070E-16 | $E_{8x}$ | 4.2586E-16 |

The curvatures of the imaging lens in the sub-scanning direction are shown in Table 3 as they occur at the center of scanning and at either end of scanning. The curvature is assumed to be positive in the case where the center of curvature of the entrance or exit surface is at the emergent side with respect to said surface and it is assumed to be negative in the reverse case, i.e., the center of curvature of the entrance or exit surface is at the incedent side with respect to said surface. Table 3 also indicates whether the cross section of the imaging lens taken in the sub-scanning direction is concave or convex.

TABLE 3

| | Entrance face | Exit face |
|---|---|---|
| Center of scanning | concave −0.0708 | convex −0.116 |
| Either end of scanning | convex +0.0908 | concave +0.0705 |

As is clear from Table 3, the imaging lens is such that the cross section of the entrance surface taken in the sub-scanning direction is concave at the center of scanning and convex at either end of scanning whereas the cross section of the exit surface taken in the sub-scanning direction is convex at the center of scanning and concave at either end of scanning.

Figure 6:
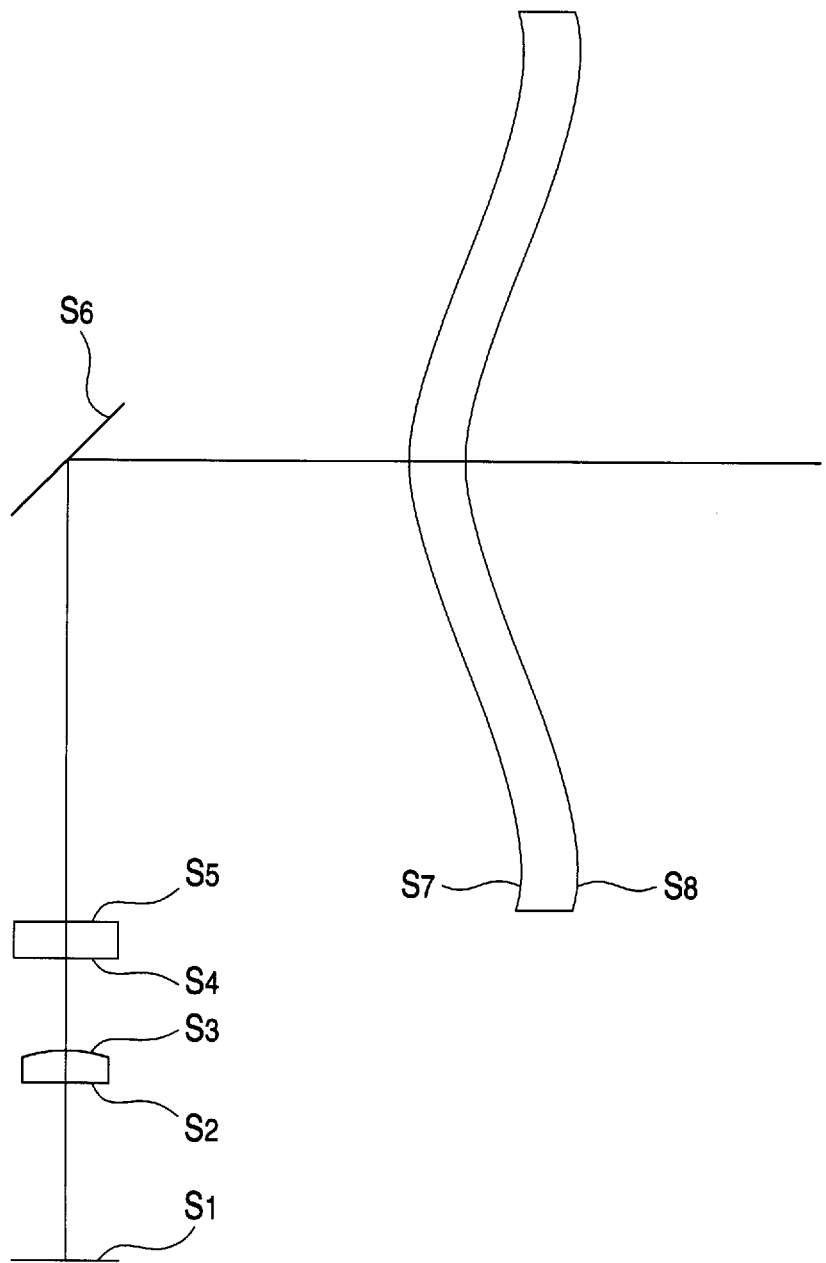
FIG. 6 shows a cross section of the optics taken in the main scanning direction as it is used in the optical scanner of Example 1 of the invention.

FIG. 6 shows a cross section of the system of Example 1 as taken in the main scanning direction and FIGS. 7A and 7B plot the aberration curves that occur in the same system. In the graph for curvature of the field, the aberration curve in the main scanning direction is represented by a dashed line and the aberration curve in the subscanning direction is represented by a solid line. In the graph for scanning linearity, the deviation in image height from the ideal value y=fθ is represented in percentage. Symbol ω appearing in both graphs represents the angle through which the rotating polygonal mirror rotates while a beam spot scans over the surface to be scanned from the center of scanning to either end of scanning.

In Example 1, the imaging lens has aspheric surfaces and although it is composed of a single element, the curvature of the field in the main scanning direction is effectively corrected to be within ±2 mm as shown in FIG. 7A. The curvature of the field oscillating through an amplitude of about 1 to 2 mm occurs because the shape of the cross section of the imaging lens taken in the main scanning direction is expressed by aspheric coefficients of only up to the 10th order. An even smaller curvature of the field can be realized by adopting higher orders of aspheric coefficients.

In addition, the entrance and exit surfaces of the imaging lens have their curvatures in the sub-scanning direction varied continuously along the main scanning direction over the effective area of the imaging lens and, hence, the curvature of the field in the sub-scanning direction is also effectively corrected to be within ±2 mm as shown in FIG. 7B. The variation of curvature in the sub-scanning direction is approximated by coefficients of up to the 12th order and an even smaller curvature of the field can be realized by adopting higher orders of coefficients.

Figure 9:
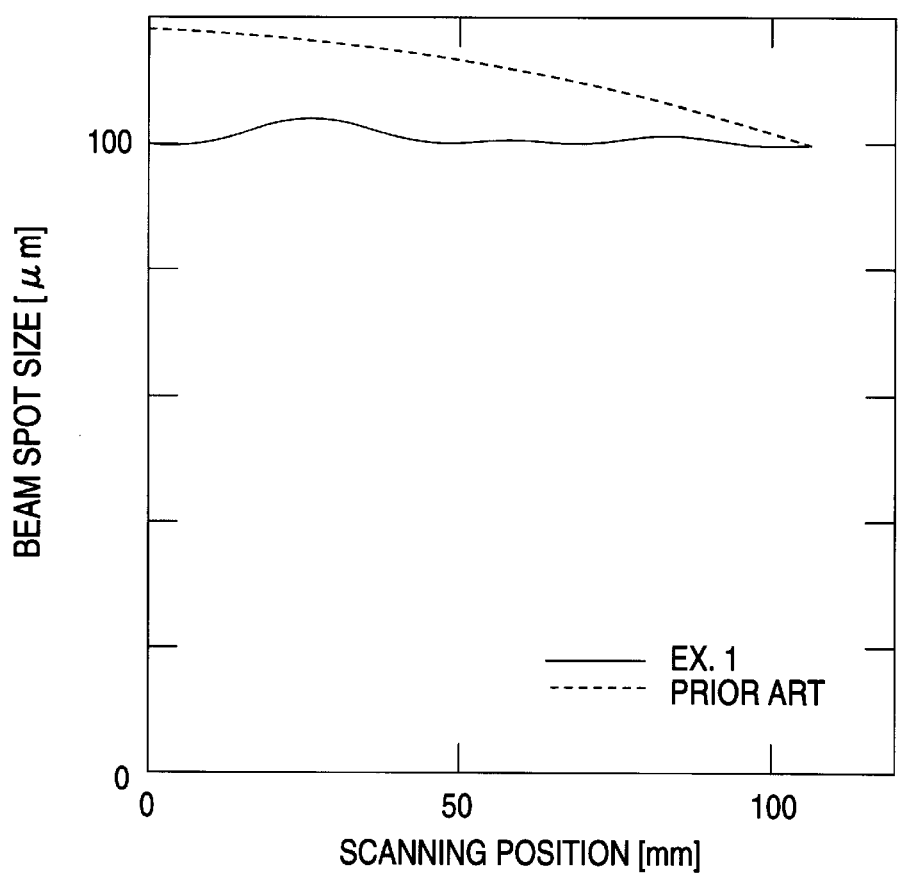
FIG. 9 plots the beam spot size in the sub-scanning direction of the system of Example 1.
Figure 10:
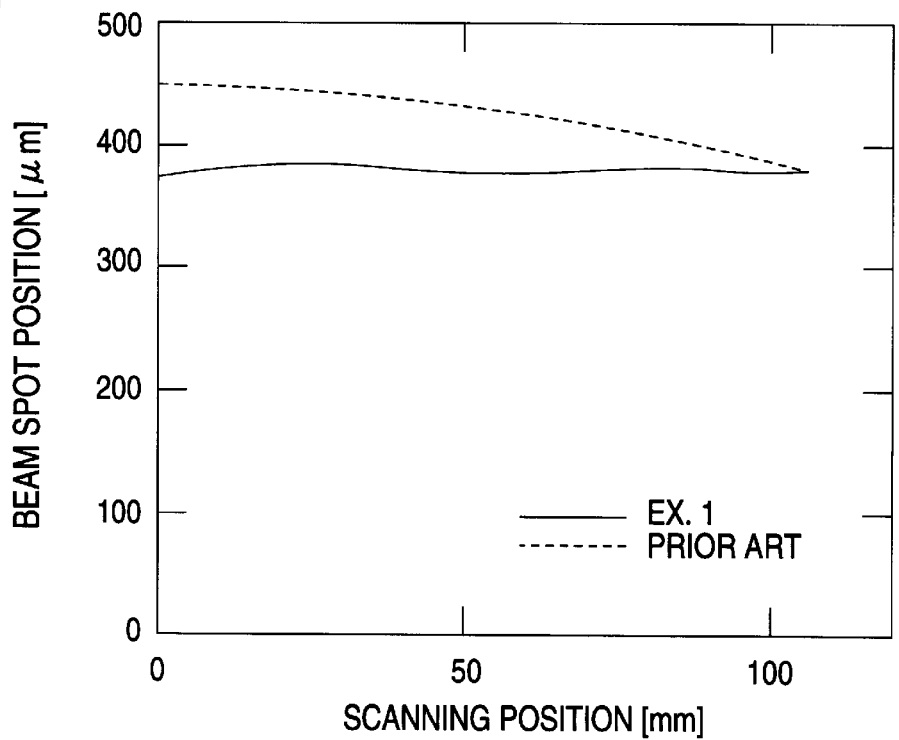
FIG. 10 plots the beam spot position in the sub-scanning direction of the system of Example 1.

The optical magnification of the imaging lens in the sub-scanning direction is plotted in FIG. 8; the beam spot size in the sub-scanning direction is plotted in FIG. 9; and the beam spot position in the sub-scanning direction is plotted in FIG. 10. In each of the graphs in FIGS. 8 to 10, the horizontal axis plots the scanning position in the surface to be scanned and the curve for the data on the system of Example 1 is indicated by a solid line whereas the curve for the data on a prior art system according to the teaching of Unexamined Published Japanese Patent Application No. 50908/1992 is indicated by a dashed line for comparison. Obviously, the system of Example 1 is superior to the prior art system in that the optical magnification, the beam spot size and the beam spot position are remarkably constant throughout the effective scanning region. The beam spot size plotted on the vertical axis of FIG. 9 is the diameter of a circle formed by connecting the points where the intensity is $1/e^2$ of the value at the beam center. The beam spot position plotted on the vertical axis of FIG. 10 refers to the position of the spot a beam forms on the surface to be scanned as it emerges from the light-emitting portion in the light source that is located 50 μm away from the optical axis in the sub-scanning direction.

EXAMPLE 2

The optical scanner according to Example 2 of the invention differs from the scanner of Example 1 with respect to the curvature of the imaging lens in the sub-scanning direction. To be more specific, the cross section of the imaging lens taken in the sub-scanning direction is such that the entrance surface is concave at the center of scanning and convex at either end of scanning whereas the exit surface is convex throughout.

The curvatures in the sub-scanning direction of the imaging lens of Example 2 and its coefficients are set forth in Table 4. For the designation of the curvatures, see the relevant explanation in Example 1. The optical specifications of the imaging lens for the main scanning direction and those of the elements other than the imaging lens are the same as in Example 1.

TABLE 4

| $u_{7x}$ | −0.19888 | $u_{8x}$ | −0.17894 |
|---|---|---|---|
| $A_{7x}$ | 9.0075E-4 | $A_{8x}$ | 4.9407E-4 |
| $B_{7x}$ | −2.4703-6 | $B_{8x}$ | −1.1834E-6 |
| $C_{7x}$ | 4.2652E-9 | $C_{8x}$ | 1.8942E-9 |
| $D_{7x}$ | −3.7445E-12 | $D_{8x}$ | −1.5223E-12 |
| $E_{7x}$ | 1.2571E-15 | $E_{8x}$ | 4.6119E-16 |

The curvatures of the imaging lens in the sub-scanning lens are shown in Table 5 as they occur at the center and either end of scanning.

TABLE 5

| | Entrance face | Exit face |
|---|---|---|
| Center of scanning | concave −0.200 | convex −0.180 |
| Either end of scanning | convex +0.0207 | convex −0.0204 |

As is clear from Table 5, the cross section of the entrance surface taken in the sub-scanning direction is concave at the center of scanning and convex at either end of scanning.

Figure 11:
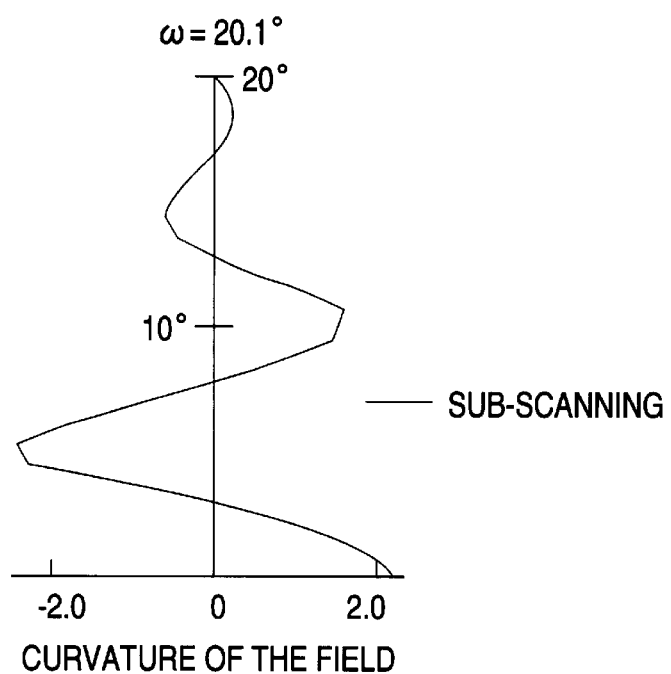
FIG. 11 plots an aberration curve that occurs in the optics used in the optical scanner of Example 2 of the invention.

FIG. 11 plots an aberration curve that occurs in the system of Example 2. Since the curvature of the field in the main scanning direction and the scanning linearity are comparable to the performance in Example 1, FIG. 11 shows only the curvature of the field in the sub-scanning direction. The entrance and exit surfaces of the imaging lens are such that the curvatures in the sub-scanning direction vary continuously along the main scanning direction over the effective area of the imaging lens and, hence, the curvature of the field in the sub-scanning direction is effectively corrected as clearly shown in FIG. 11.

Figure 12:
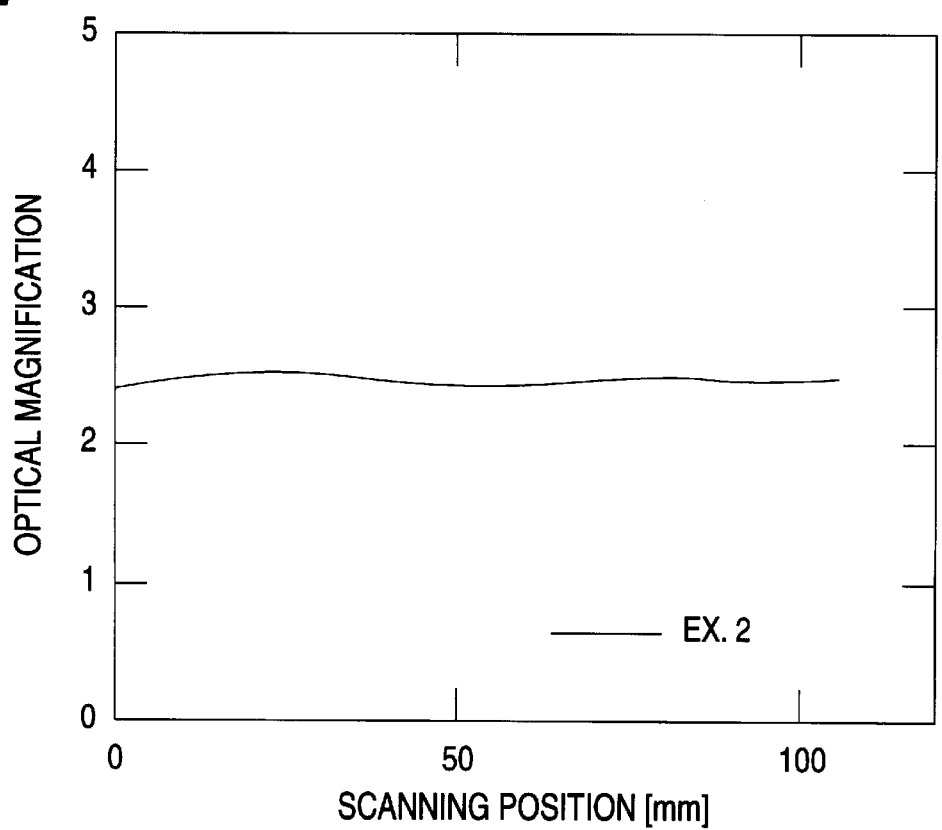
FIG. 12 plots the optical magnification in the sub-scanning direction of the system of Example 2.
Figure 13:
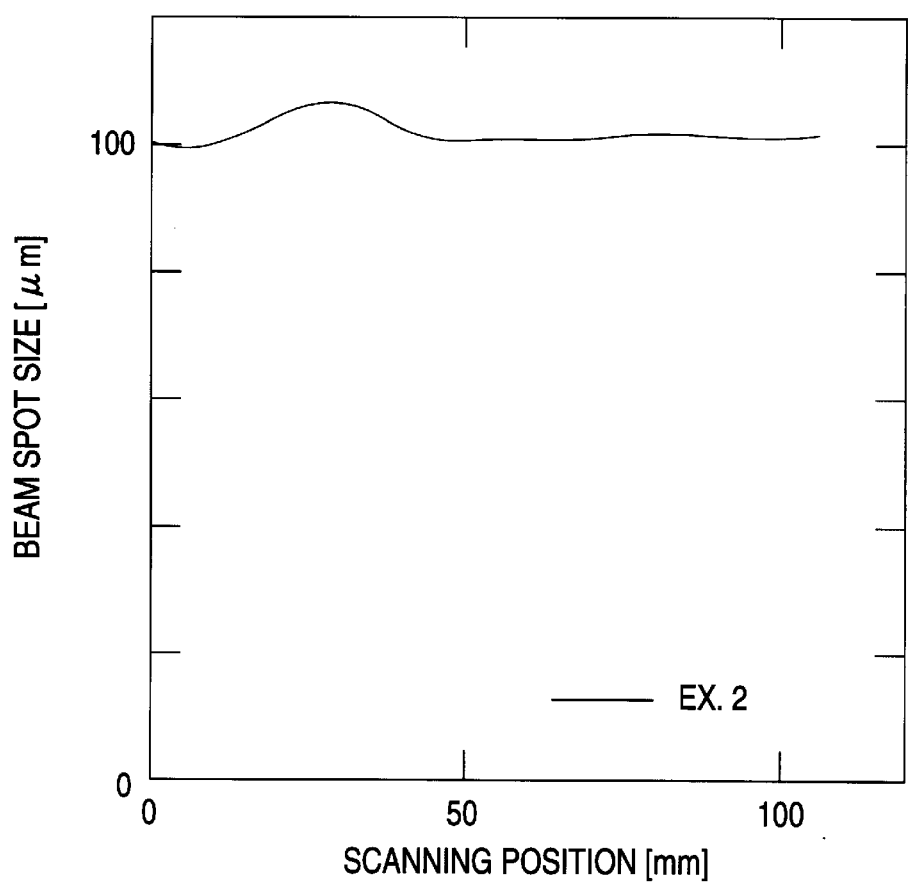
FIG. 13 plots the beam spot size in the sub-scanning direction of the system of Example 2.
Figure 14:
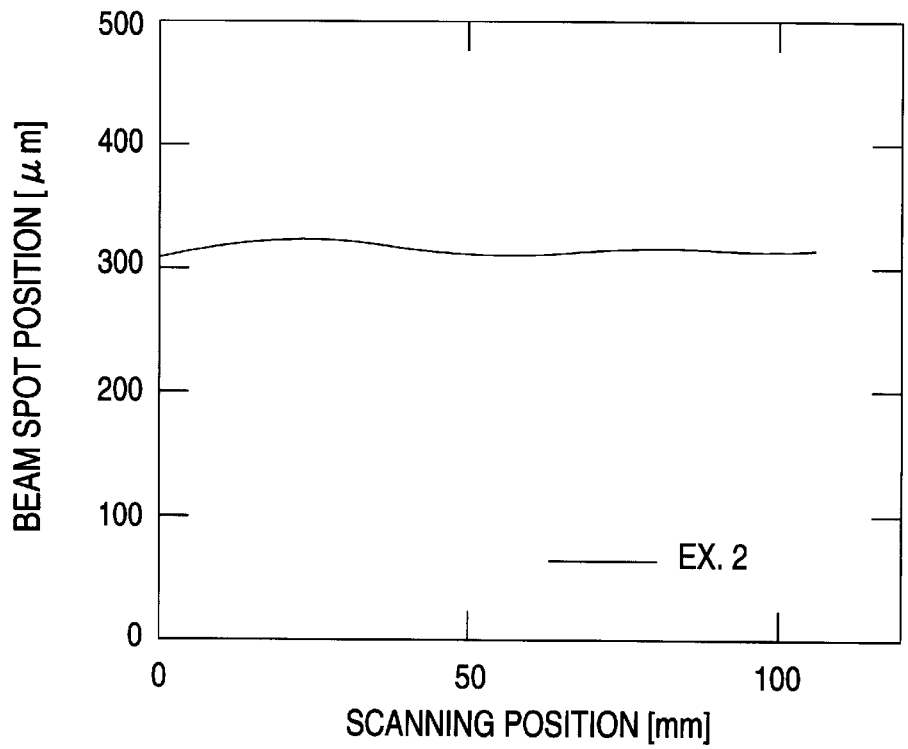
FIG. 14 plots the beam spot position in the sub-scanning direction of the system of Example 2.

The optical magnification of the imaging lens in the sub-scanning direction is plotted in FIG. 12; the beam spot size in the sub-scanning direction is plotted in FIG. 13; and the beam spot position in the sub-scanning direction is plotted in FIG. 14. Obviously, the optical magnification, the beam spot size and the beam spot position are remarkably constant throughout the effective scanning region.

EXAMPLE 3

The optical scanner according to Example 3 of the invention also differs from the scanner of Example 1 with respect to the curvature of the imaging lens in the sub-scanning direction. To be more specific, the cross section of the imaging lens taken in the sub-scanning direction is such that the entrance surface is convex throughout whereas the exit surface is convex at the center of scanning and concave at either end of scanning.

The curvatures in the sub-scanning direction of the imaging lens of Example 3 and its coefficients are set forth in Table 6. For the designation of the curvatures, see the relevant explanation in Example 1. The optical specifications of the imaging lens for the main scanning direction and those of the elements other than the imaging lens are the same as in Example 1.

TABLE 6

| $u_{7x}$ | 0.039444 | $u_{8x}$ | −0.032522 |
|---|---|---|---|
| $A_{7x}$ | 3.7185E-4 | $A_{8x}$ | 4.6564E-4 |
| $B_{7x}$ | −1.0114E-6 | $B_{8x}$ | −9.6765E-7 |
| $C_{7x}$ | 1.7734E-9 | $C_{8x}$ | 1.5423E-9 |
| $D_{7x}$ | −1.5609E-12 | $D_{8x}$ | −1.2334E-12 |
| $E_{7x}$ | 5.2925E-16 | $E_{8x}$ | 3.7693E-16 |

The curvatures of the imaging lens in the sub-scanning direction are shown in Table 7 as they occur at the center and either end of scanning.

TABLE 7

| | Entrance face | Exit face |
|---|---|---|
| Center of scanning | convex +0.0392 | convex −0.0329 |
| Either end of scanning | convex +0.151 | concave +0.188 |

As is clear from Table 7, the cross section of the exit surface taken in the sub-scanning direction is convex at the center of scanning and concave at either end of scanning.

Figure 15:
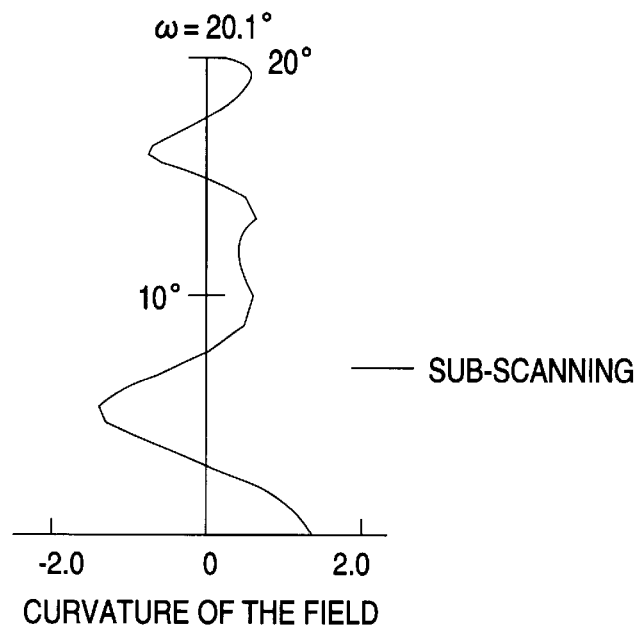
FIG. 15 plots an aberration curve that occurs in the optics used in the optical scanner of Example 3 of the invention.

FIG. 15 plots an aberration curve that occurs in the system of Example 3. Since the curvature of the field in the main scanning direction and the scanning linearity are comparable to the performance in Example 1, FIG. 15 shows only the curvature of the field in the sub-scanning direction. The entrance and exit surfaces of the imaging lens are such that the curvatures in the sub-scanning direction vary continuously along the main scanning direction over the effective area of the imaging lens and, hence, the curvature of the field in the sub-scanning direction is effectively corrected as clearly sown in FIG. 15.

Figure 16:
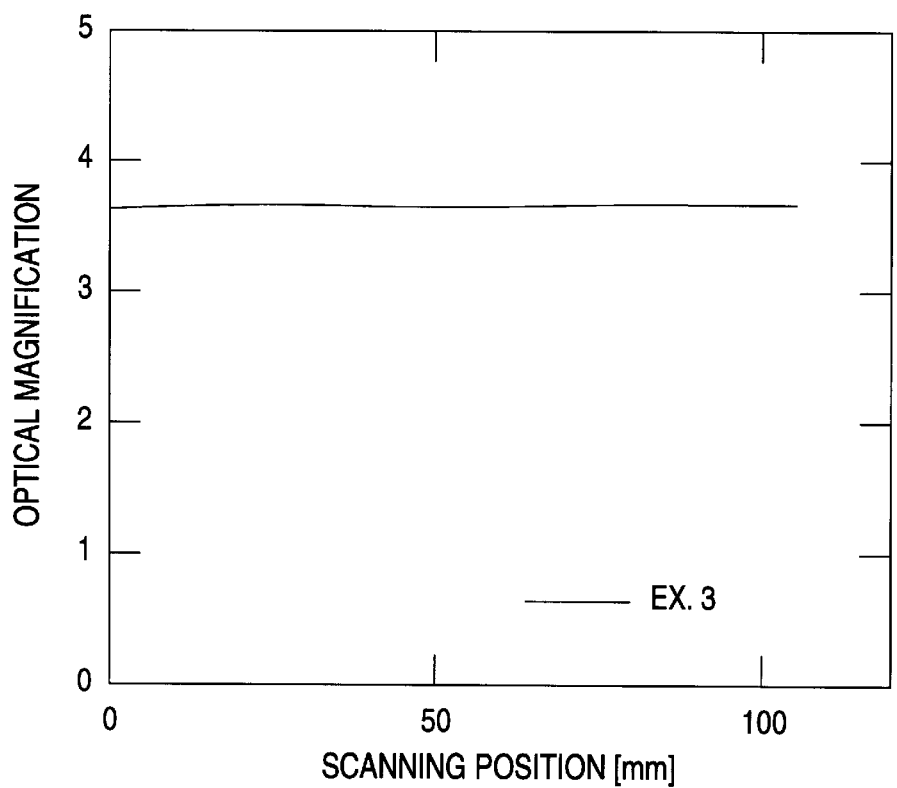
FIG. 16 plots the optical magnification in the sub-scanning direction of the system of Example 3.
Figure 17:
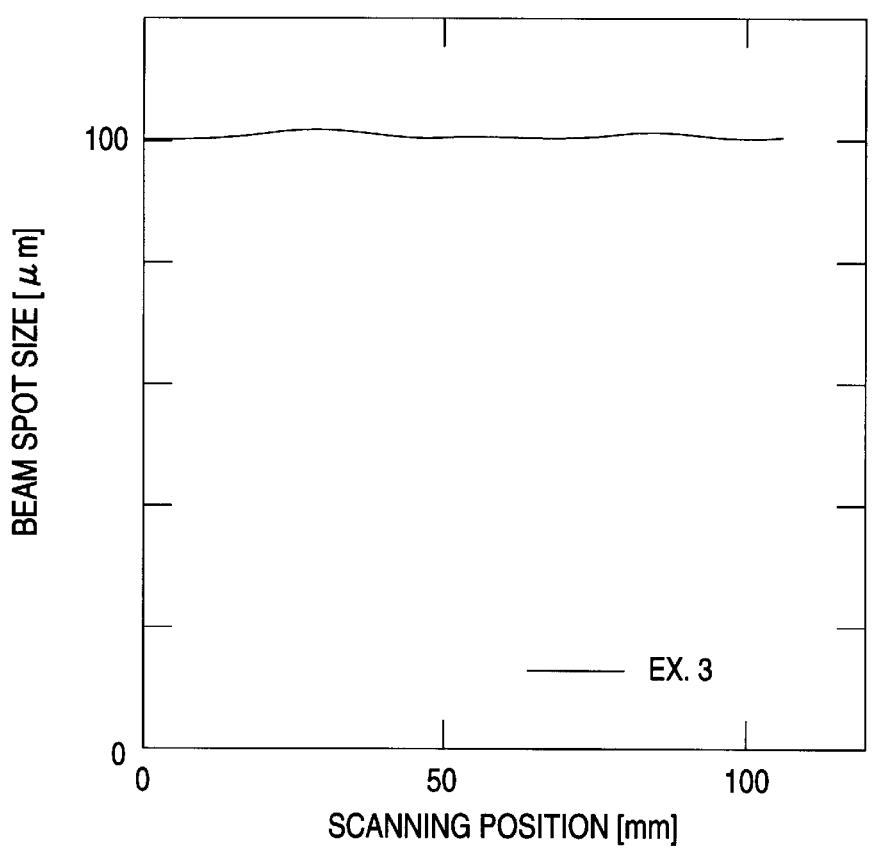
FIG. 17 plots the beam spot size in the sub-scanning direction of the system of Example 3.
Figure 18:
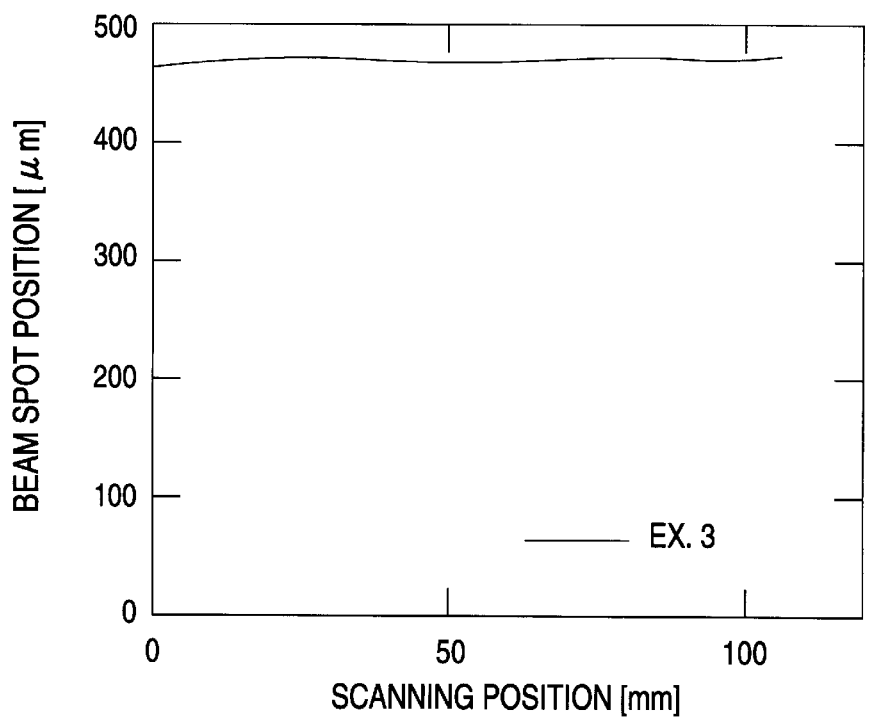
FIG. 18 plots the beam spot position in the sub-scanning direction of the system of Example 3.

The optical magnification of the imaging lens in the sub-scanning direction is potted in FIG. 16; the beam spot size in the sub-scanning direction is plotted in FIG. 17; and the beam spot position in the sub-scanning direction is plotted in FIG. 18. Obviously, the optical magnification, the beam spot size and the beam spot position are remarkable constant throughout the effective scanning region.

EXAMPLE 4

The optical scanner of Example 4 is composed of the similar elements to in Example 1 but has different optical specifications. In Example 4, a parallel beam issues from the collimator lens. The shape of the imaging lens also differs from what is used in Example 1.

Figure 19:
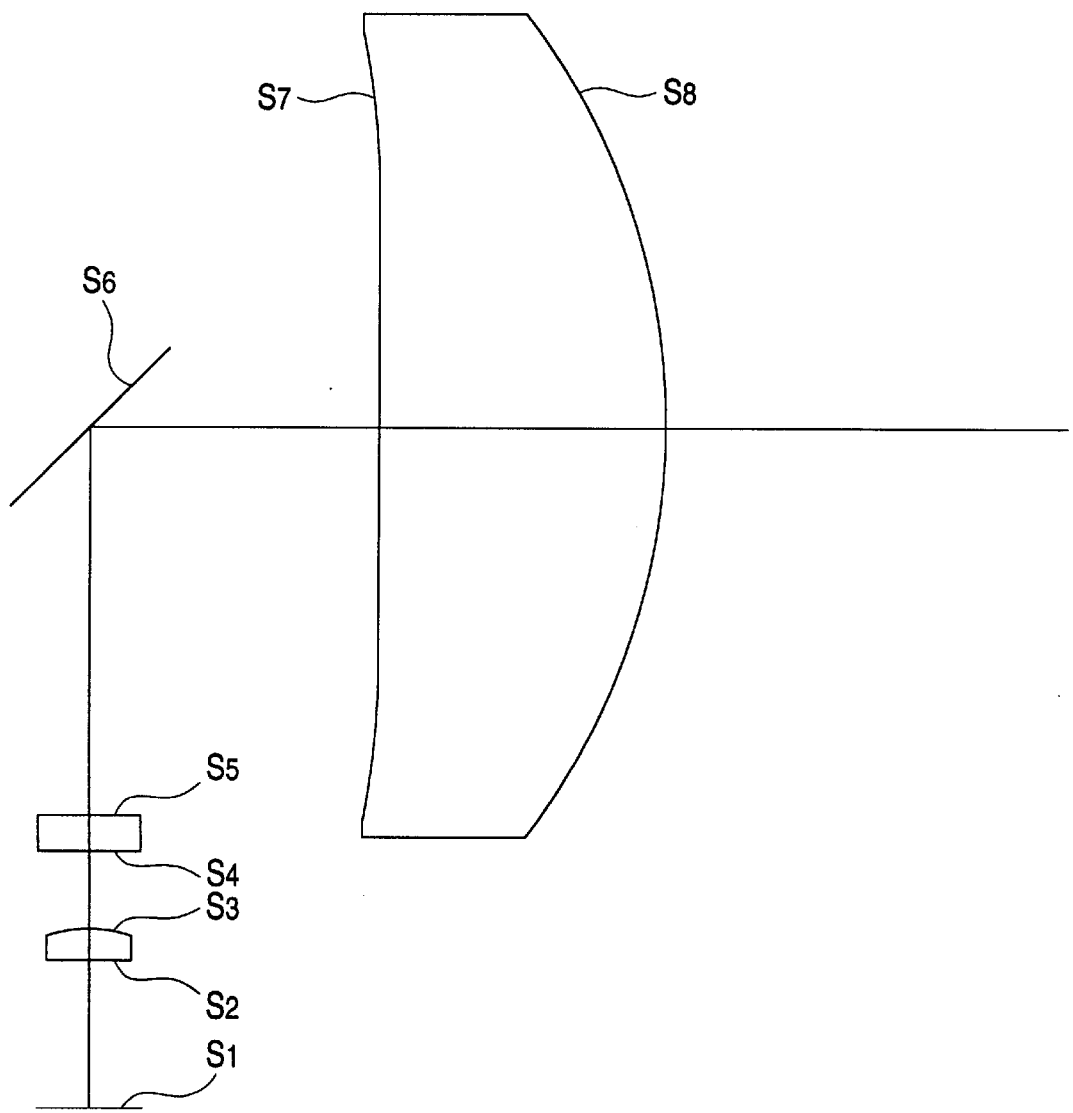
FIG. 19 shows a cross section of the optics in the main scanning direction as it is used in the optical scanner of Example 4 of the invention.

FIG. 19 shows a cross section of the optical scanner of Example 4 as taken in the main scanning direction. As shown, the cross section of the imaging lens 6 taken in the main scanning direction is such that both the entrance surface $S_7$ and the exit surface $S_8$ are aspheric. It should also be noted that on both surfaces $S_7$ and $S_8$, the curvature in the sub-scanning direction varies continuously along the main scanning direction over the effective area of the imaging lens.

The optical Specifications of the system of Example 4 are set forth in Table 8. For the designation of the symbols used in Table 8, see the relevant explanation in Example 1.

TABLE 8

$2\omega = 40.0°$

| Surface $S_i$ | | Radius of curvature $r_i$ | Distance between surfaces $d_i$ | Refractive index $n_i$ |
|---|---|---|---|---|
| $S_1$ | | | 15.264 | |
| $S_2$ | | ∞ | 2.800 | 1.67500 |
| $S_3$ | | −11.432 | 8.000 | |
| $S_4$ | $r_{4x}$ | 21.462 | 3.000 | 1.51118 |
| | $r_{4y}$ | ∞ | | |
| $S_5$ | | ∞ | 40.000 | |
| $S_6$ | | ∞ | 30.000 | |
| $S_7$ | $u_{7x}$ | 0.03950 | 30.000 | 1.48600 |
| | $r_{7y}$ | 433.90 | | |
| $S_8$ | $u_{8x}$ | −0.03733 | 140.000 | |
| | $r_{8y}$ | −81.04 | | |

The curvatures in the sub-scanning direction of the imaging lens of Example 4 and its coefficients are set forth in Table 9. For the designation of the curvatures, see the relevant explanation in Example 1.

TABLE 9

| $u_{7x}$ | 0.03950 | $u_{8x}$ | −0.03733 |
|---|---|---|---|
| $A_{7x}$ | −3.870E-5 | $A_{8x}$ | 2.633E-6 |
| $B_{7x}$ | 6.953E-8 | $B_{8x}$ | −4.546E-10 |
| $C_{7x}$ | −9.908E-11 | $C_{8x}$ | −1.481E-14 |
| $D_{7x}$ | 9.566E-14 | $D_{8x}$ | 3.751E-16 |
| $E_{7x}$ | −4.143E-17 | $E_{8x}$ | −2.330E-19 |

The curvatures of the imaging lens in the sub-scanning direction are shown in Table 10 as they occur at the center and either end of scanning.

TABLE 10

| | Entrance face | Exit face |
|---|---|---|
| Center of scanning | convex +0.0395 | convex −0.0373 |
| Either end of scanning | convex +0.0289 | convex +0.0346 |

Figure 20A:
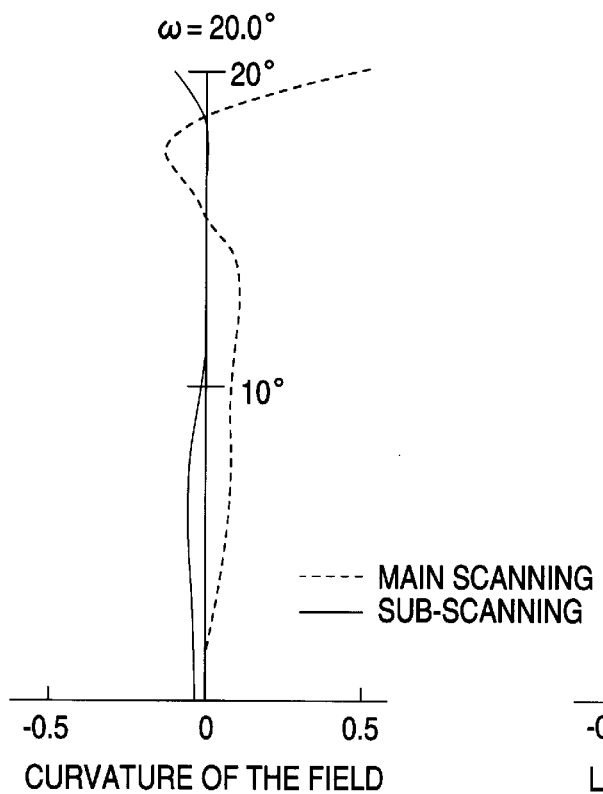
FIGS. 20A and 20B plot aberration curves that occur in the optics shown in FIG. 19.
Figure 20B:
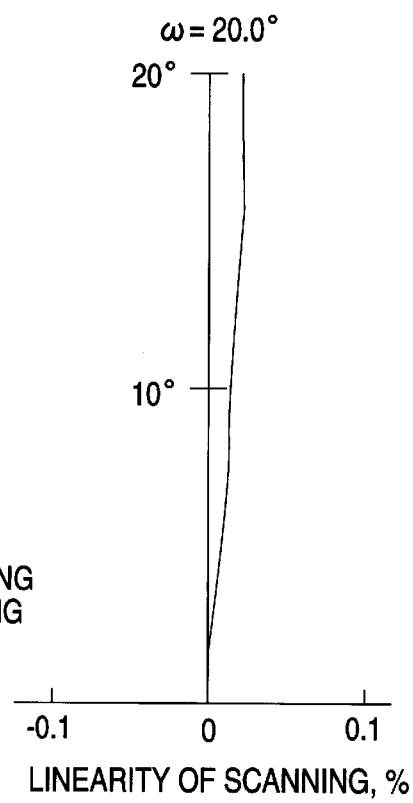

FIGS. 20A and 20B plot aberration curves that occur in the system of Example 4. Obviously, both the curvature of the field and the scannability at uniform speed are corrected effectively.

Figure 21:
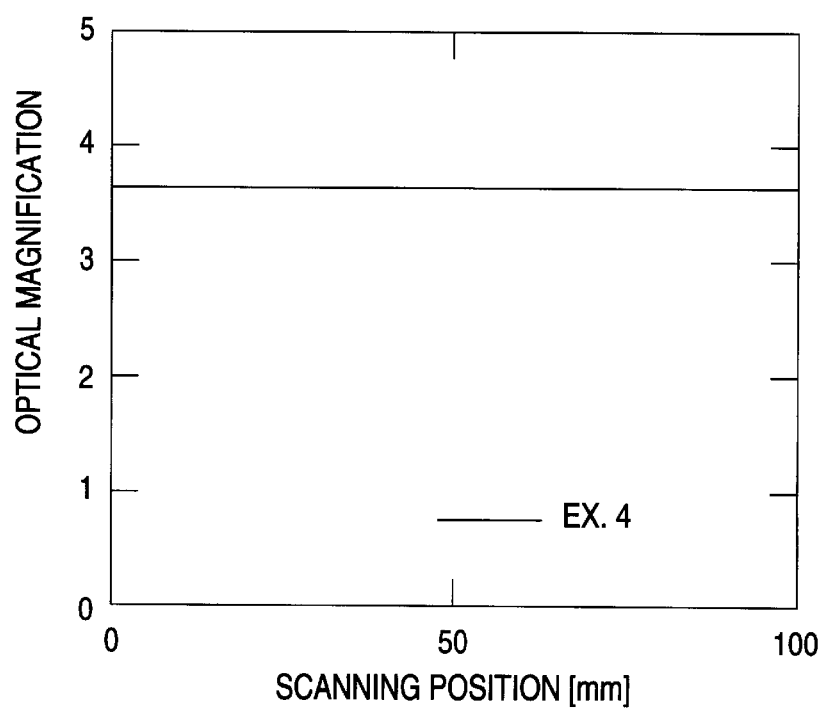
FIG. 21 plots the optical magnification in the sub-scanning direction of the system of Example 4.
Figure 22:
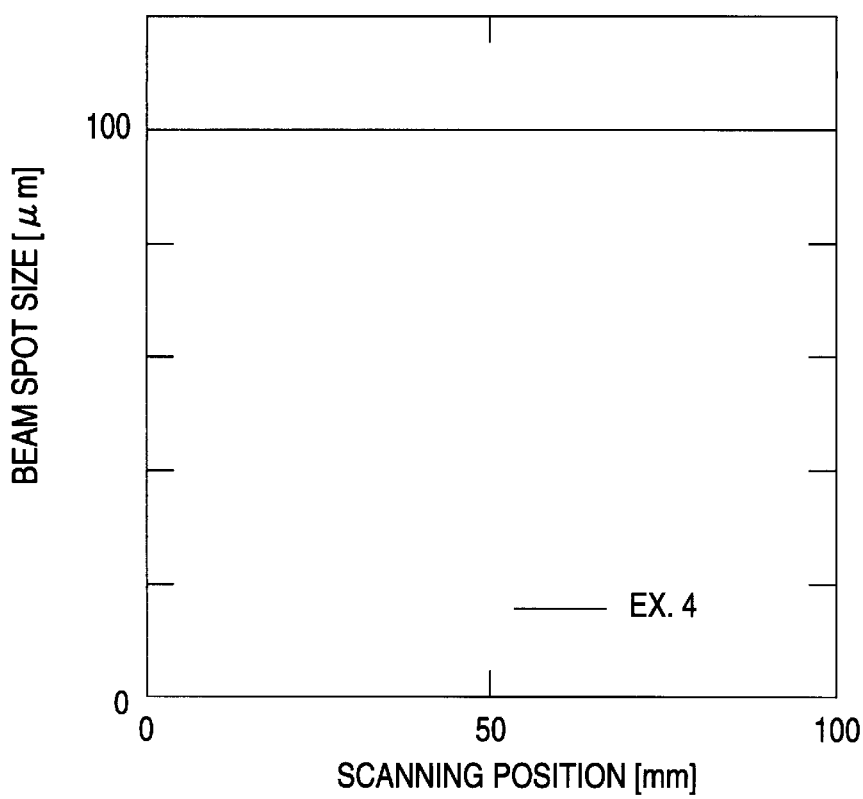
FIG. 22 plots the beam spot size in the sub-scanning direction of the system of Example 4.
Figure 23:
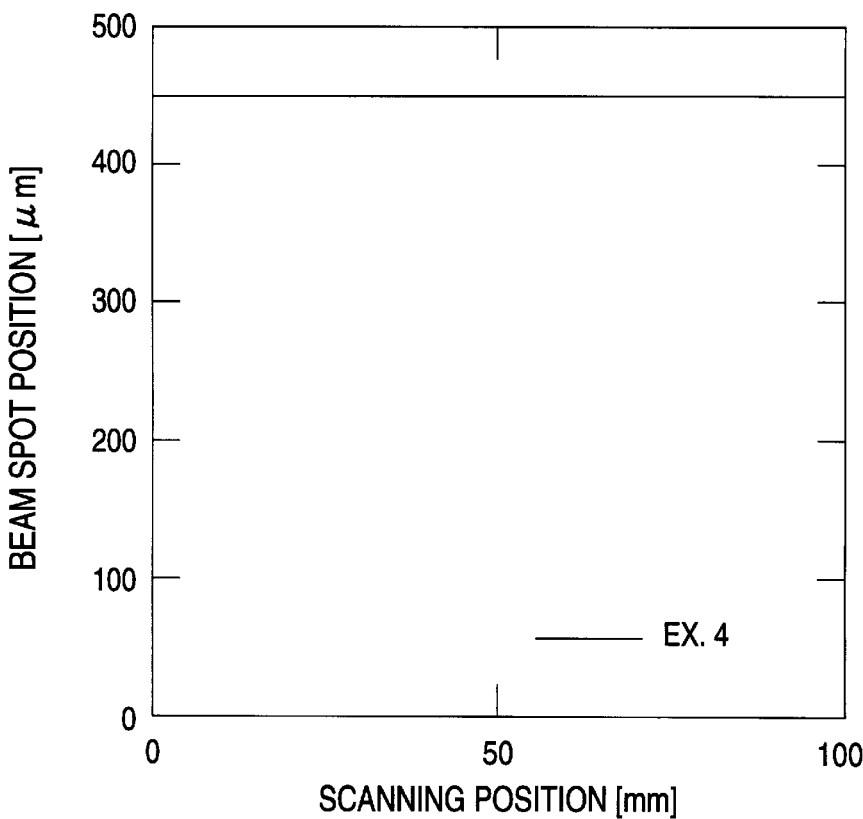
FIG. 23 plots the beam spot position in the sub-scanning direction of the system of Example 4.

The optical magnification of the imaging lens in the sub-scanning direction is plotted in FIG. 21; and the beam spot size in the sub-scanning direction is plotted in FIG. 22; and the beam spot position in the sub-scanning direction is plotted in FIG. 23. Obviously, the optical magnification, the beam spot size and the beam spot position are remarkably constant throughout the effective scanning region.

In short, the present invention offers the following advantages.

According to the invention, in an optical scanner having a source of a light beam, a deflector for deflecting the light beam and an imaging lens that focuses the deflected light beam to form a beam spot on a surface to be scanned, the curvatures in a sub-scanning direction of at least two of the surfaces of the imaging lens vary continuously along a main scanning direction over the effective area of the imaging lens and independently of the curvatures in the main scanning direction. Therefore, the curvature of the field in the sub-scanning direction is completely corrected and, in addition, a beam spot is produced that has a uniform size in the sub-scanning direction.

According to the invention, the optical magnification of the imaging lens in the sub-scanning direction is constant over the effective scanning region. Therefore, one can produce a beam spot that has a more uniform size in the sub-scanning direction.

According to the invention, the imaging lens is a single lens. Therefore, one can manufacture an optical scanner of a simple design.

According to the invention, the imaging lens satisfies either one of the following requirements:

a) the entrance face of the imaging lens have a cross section taken in the sub-scanning direction which is concave at the center of scanning and convex at either end of scanning;

b) the exit face of the imaging lens have a cross section taken in the sub-scanning direction which is convex at the center of scanning and concave at either end of scanning. Therefore, one can realize a thin imaging lens.

According to the invention, the imaging lens satisfies both requirements a) and b). Therefore, the spherical aberration can be reduced and one can produce a beam spot of a satisfactory shape.

According to the invention, the imaging lens has a surface that is aspheric in the main scanning direction. Therefore, both the curvature of the field in the sub-scanning direction and the scanning linearity can be effectively corrected.

According to the invention, the imaging lens has a surface having a point of inflection in the main scanning direction. Therefore, both the curvature of the field in the sub-scanning direction and the scanning linearity can be corrected more effectively.

According to the invention, the light source has a plurality of light-emitting portions. Therefore, both the scanning speed and the resolution can be increased and, in addition, the spacing between scanning lines which the beams from a plurality of light-emitting portions form on the surface to be scanned becomes constant.

According to the invention, the imaging lens can be easily manufactured in large quantities and at low cost because the element of the imaging lens which has such a surface that the curvature in the sub-scanning direction varies continuously along the main scanning direction over the effective area of said imaging lens is made of resin.

What we claim is:

1. In an optical scanner having a source of a light beam, a deflector for deflecting said light beam and an imaging lens that focuses the deflected light beam to form a beam spot on a surface to be scanned, the improvement wherein the curvatures in a sub-scanning direction of at least two of the surfaces of said imaging lens vary continuously along a main scanning direction over the effective area of said imaging lens and independently of the curvatures in the main scanning direction, and wherein the curvatures in the main and sub-scanning directions are non-symmetrical with respect to the optical axis.

2. An optical scanner according to claim 1, wherein the optical magnification of said imaging lens in the sub-scanning direction is constant over the effective scanning region.

3. An optical scanner according to claim 1 or 2, wherein said imaging lens is a single lens.

4. An optical scanner according to claim 3, wherein said imaging lens satisfies either one of the following requirements:
   a) the entrance face of said imaging lens has a cross section taken in the sub-scanning direction which is concave at the center of scanning and convex at either end of scanning;
   b) the exit face of said imaging lens has a cross section taken in the sub-scanning direction which is convex at the center of scanning and concave at either end of scanning.

5. An optical scanner according to claim 4, wherein said imaging lens satisfies both requirements a) and b).

6. An optical scanner according to claim 5, wherein said imaging lens has a surface that is aspheric in the main scanning direction.

7. An optical scanner according to claim 6, wherein said imaging lens has a surface having a point of inflection in the main scanning direction.

8. An optical scanner according to claim 6, wherein said light source has a plurality of light-emitting portions.

9. An optical scanner according to any one of claim 8, wherein that element of the imaging lens which has such a surface that the curvature in the sub-scanning direction varies continuously along the main scanning direction over the effective area of said imaging lens is made of resin.

10. An optical scanner according to claim 1, wherein said imaging lens has a surface that is aspheric in the main scanning direction.

11. An optical scanner according to claim 10, wherein said imaging lens has a surface having a point of inflection in the main scanning direction.

12. An optical scanner according to claim 1, wherein said light source has a plurality of light-emitting portions.

13. An optical scanner according to claim 12, wherein that element of the imaging lens which has such a surface that the curvature in the sub-scanning direction varies continuously along the main scanning direction over the effective area of said imaging lens is made of resin.

* * * * *